(12) United States Patent
Tanizaki et al.

(10) Patent No.: US 10,455,102 B2
(45) Date of Patent: *Oct. 22, 2019

(54) PRINT DEVICE

(71) Applicant: Brother Kogyo Kabushiki Kaisha, Nagoya-shi, Aichi-ken (JP)

(72) Inventors: Masashi Tanizaki, Kuwana (JP); Nobuo Kato, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 129 days.

This patent is subject to a terminal disclaimer.

(21) Appl. No.: 15/432,503

(22) Filed: Feb. 14, 2017

(65) Prior Publication Data

US 2017/0155781 A1 Jun. 1, 2017

Related U.S. Application Data

(63) Continuation of application No. 15/081,119, filed on Mar. 25, 2016, now Pat. No. 9,597,906.

(30) Foreign Application Priority Data

Mar. 31, 2015 (JP) .................................. 2015-071182

(51) Int. Cl.
*B41J 29/02* (2006.01)
*B41J 29/13* (2006.01)
(Continued)

(52) U.S. Cl.
CPC ........ *H04N 1/00538* (2013.01); *B41J 3/4075* (2013.01); *B41J 29/02* (2013.01);
(Continued)

(58) Field of Classification Search
CPC ........... H04N 1/00538; H04N 1/00384; H04N 1/00493; H04N 1/00496;
(Continued)

(56) References Cited

U.S. PATENT DOCUMENTS 5,364,196 A 11/1994 Baitz et al.
5,921,402 A 7/1999 Magenheimer
(Continued)

FOREIGN PATENT DOCUMENTS

CN 103287116 A 9/2013
EP 0 454 415 A2 10/1991
(Continued)

OTHER PUBLICATIONS

Oct. 31, 2017—(JP) Notification of Reasons for Rejection—App 2015-071182, Eng Tran.
(Continued)

*Primary Examiner* — Scott A Richmond
(74) *Attorney, Agent, or Firm* — Banner & Witcoff, Ltd.

(57) ABSTRACT

A print device includes a housing, a lid body, a display device, and a mounting portion. An opening is formed in an upper portion of the housing. The lid body opens and closes the opening of the housing by a second end portion side of the lid body pivoting around a predetermined rotation axis provided at a first end portion of the lid body. The mounting portion is provided on an upper portion of the lid body when the opening is closed. The display device can be attached to and detached from the mounting portion along a predetermined attachment/detachment direction with respect to the lid body. The attachment/detachment direction is orthogonal to an extending direction of a tangent line. The tangent line is tangential to a circumferential direction of the rotation axis at a position of the second end portion of the lid body.

5 Claims, 13 Drawing Sheets

(51) Int. Cl.
*H04N 1/00* (2006.01)
*B41J 3/407* (2006.01)
(52) U.S. Cl.
CPC .......... *B41J 29/13* (2013.01); *H04N 1/00384* (2013.01); *H04N 1/00493* (2013.01); *H04N 1/00496* (2013.01); *H04N 1/00554* (2013.01); *H04N 2201/0063* (2013.01); *H04N 2201/0082* (2013.01)
(58) Field of Classification Search
CPC ..... H04N 2201/0082; H04N 2201/0063; B41J 3/4075; B41J 29/02; B41J 29/13
See application file for complete search history.

(56) References Cited

U.S. PATENT DOCUMENTS

| | | | |
|---|---|---|---|
| 8,920,056 B2 | 12/2014 | Matsumura | |
| 9,597,906 B2* | 3/2017 | Tanizaki | B41J 29/02 |
| 2008/0133806 A1 | 6/2008 | Mori | |
| 2009/0029732 A1* | 1/2009 | Silverbrook | B41J 2/01 |
| | | | 455/556.1 |
| 2013/0027497 A1* | 1/2013 | Terrill | B41J 29/13 |
| | | | 347/222 |
| 2013/0241375 A1 | 9/2013 | Matsumura | |

FOREIGN PATENT DOCUMENTS

| | | | |
|---|---|---|---|
| JP | S60-191047 U | | 12/1985 |
| JP | S62-220056 A | | 9/1987 |
| JP | H02-058820 U | | 4/1990 |
| JP | H05-507803 A | | 11/1993 |
| JP | H08-297526 A | | 11/1996 |
| JP | 2004-214978 A | | 7/2004 |
| JP | 2004214978 A | * | 7/2004 |
| JP | 2007-172014 A | | 7/2007 |
| JP | 2008-198070 A | | 8/2008 |
| JP | 2009-233861 A | | 10/2009 |
| JP | 2009233861 A | * | 10/2009 |
| JP | 2013-059920 A | | 4/2013 |
| JP | 2013-154478 A | | 8/2013 |
| JP | 2013-176896 A | | 9/2013 |

OTHER PUBLICATIONS

Dec. 23, 2016—(EP) Extended Search Report—App 16161245.2.
Sep. 14, 2018—(EP) Office Action—App 16161245.2.
Dec. 3, 2018—(CN) Notification of First Office Action—App 201610150880.X, Eng Tran.

* cited by examiner

PRINT DEVICE

CROSS-REFERENCE TO RELATED APPLICATION

This application is a Continuing Application of U.S. Ser. No. 15/081,119 filed on Mar. 25, 2016, which claims priority to Japanese Patent Application No. 2015-071182, filed on Mar. 31, 2015, the content of which is hereby incorporated by reference.

BACKGROUND

The present disclosure relates to a print device provided with an input device that can be attached to and detached from a housing.

SUMMARY

A settlement terminal device is known in which a keyboard is provided integrally with a lid body that is provided on an upper portion of a housing such that the lid body can be opened and closed. In the settlement terminal device, the rear end side of the lid body is coupled to the housing by a hinge, and the front end side of the lid body can be opened upward at the time of replacement of a roll paper or at the time of maintenance of the device.

Further, an information processing device is known that is configured such that a keyboard can be placed on an upper surface of a housing. The keyboard of the information processing device is a separate body from the housing and is not fixed to the housing. Therefore, a user can remove the keyboard from the placement surface and can perform an input operation. The placement surface of the keyboard is provided with a protruding piece. The protruding piece comes into contact with a recessed portion provided in the keyboard, and thus the movement of the keyboard on the placement surface is restricted in the front-rear direction and the left-right direction.

However, with the configuration in which the lid body that can be opened and closed is provided on the upper portion of the housing and the input device provided as a separate body is placed on the lid body, when the user attempts to open the lid body, there is a possibility that the input device may be lifted by an erroneous operation by the user and the input device may become disengaged from the lid body.

It is an object of the present disclosure to provide a print device in which an opening/closing direction of a lid body provided on an upper portion of a housing is different from an attachment/detachment direction of an input device that is mounted on an upper portion of the lid body.

Various exemplary embodiments of the general principles described herein provide print a device that includes a housing, a lid body, a display device, and a mounting portion. The housing has an opening formed in an upper portion thereof and internally houses a print portion and a control portion. The print portion prints on a print medium. The control portion controls driving of the print portion. The lid body is disposed on the upper portion of the housing. The lid body opens and closes the opening of the housing by a side of a second end portion of the lid body pivoting around a predetermined rotation axis provided at a first end portion of the lid body. The display device displays information related to printing controlled by the control portion. The mounting portion is provided on an upper portion of the lid body when the opening of the housing is closed. The display device can be attached to and detached from the mounting portion along a predetermined attachment/detachment direction with respect to the lid body. The attachment/detachment direction is a direction orthogonal to an extending direction of a tangent line. The tangent line is tangential to a circumferential direction of the rotation axis at a position of the second end portion of the lid body.

Exemplary embodiments herein provide a print device that includes a housing portion and a rotating member. The housing portion internally houses a print portion that prints on a print medium. The rotating member is configured to pivot around a predetermined rotation axis with respect to the housing portion. And the rotating member can be attached to and detached from the housing portion along to an axial direction of the rotation axis.

BRIEF DESCRIPTION OF THE DRAWINGS

Embodiments will be described below in detail with reference to the accompanying drawings in which.

DETAILED DESCRIPTION

Figure 1:
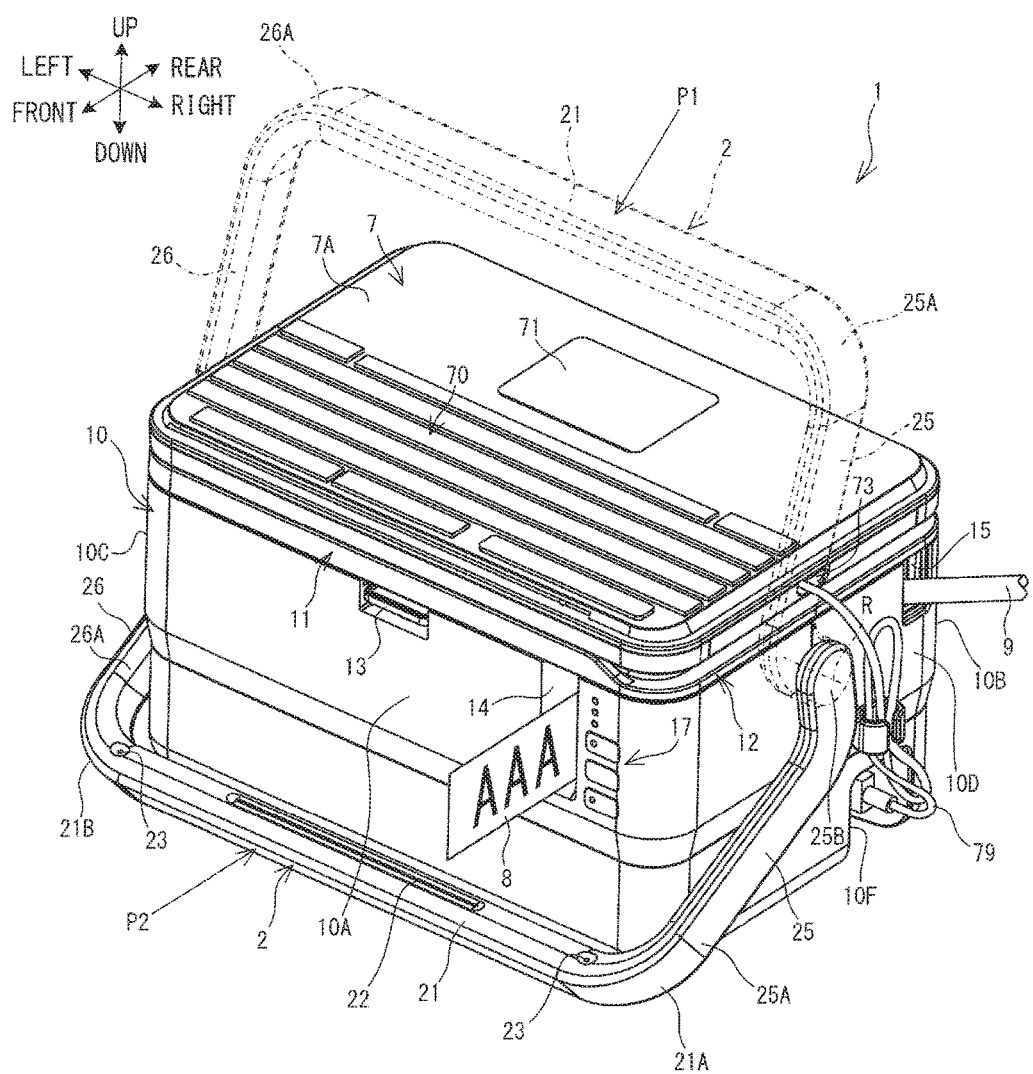
FIG. 1 is a perspective view of a print device 1 as viewed from the upper front right side.

Hereinafter, an embodiment will be described with reference to the drawings. The drawings referred to are used to explain technological features that can be employed by the present disclosure. The illustrated device structure is not intended to limit it to that form, and is merely an explanatory example.

An outline of a structure of a print device 1 of the present disclosure will be described with reference to FIG. 1 to FIG. 4. FIG. 4 shows a state in which a tape cassette 80, a ribbon cassette 90 and a tube 9 are mounted in a tape mounting portion 30, a ribbon mounting portion 35 and a tube mounting portion 40, respectively. Up, down, left, right, front and rear directions indicated by arrows in the drawings are used in the description below.

Figure 2:
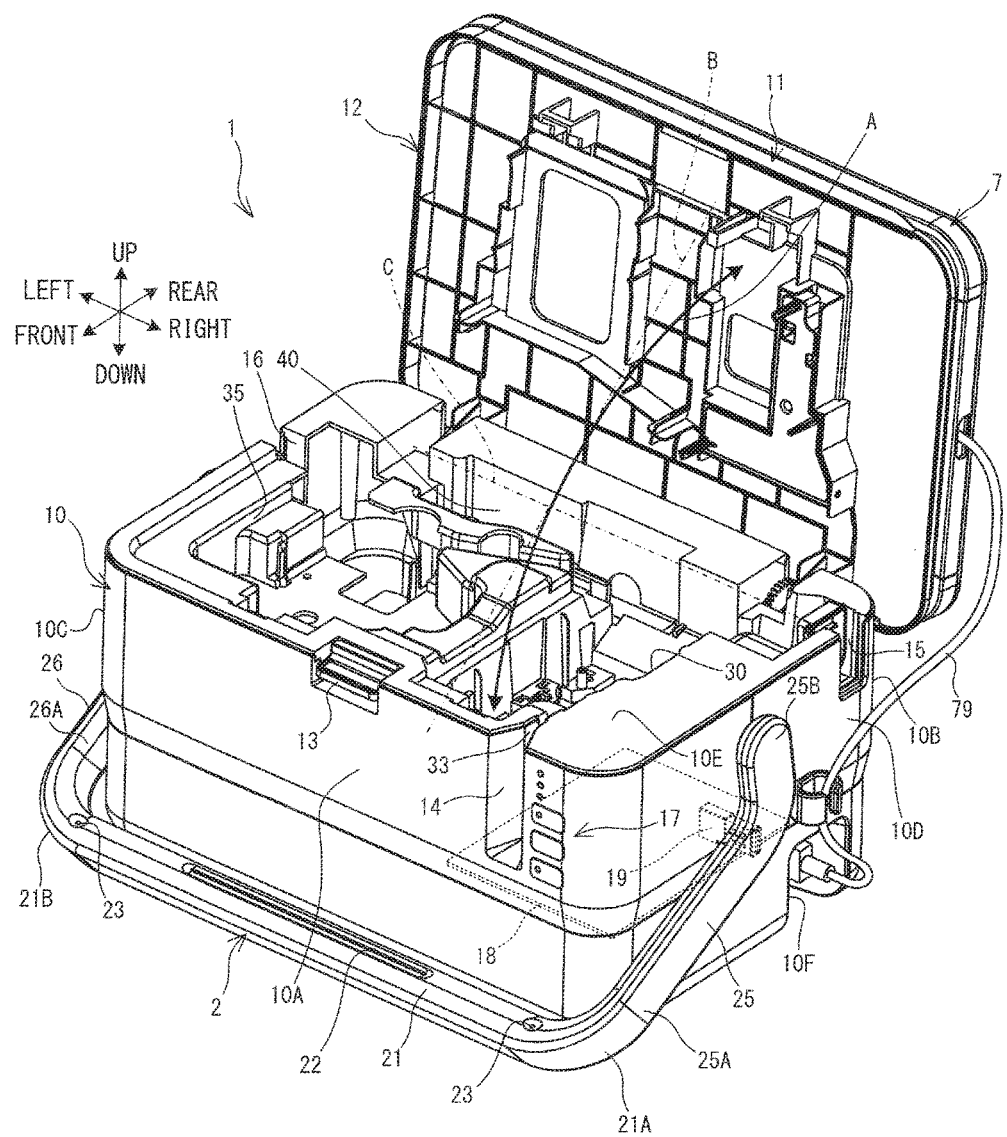
FIG. 2 is a perspective view of the print device 1 when a cover 12 is opened, as viewed from the upper front right side.
Figure 3:
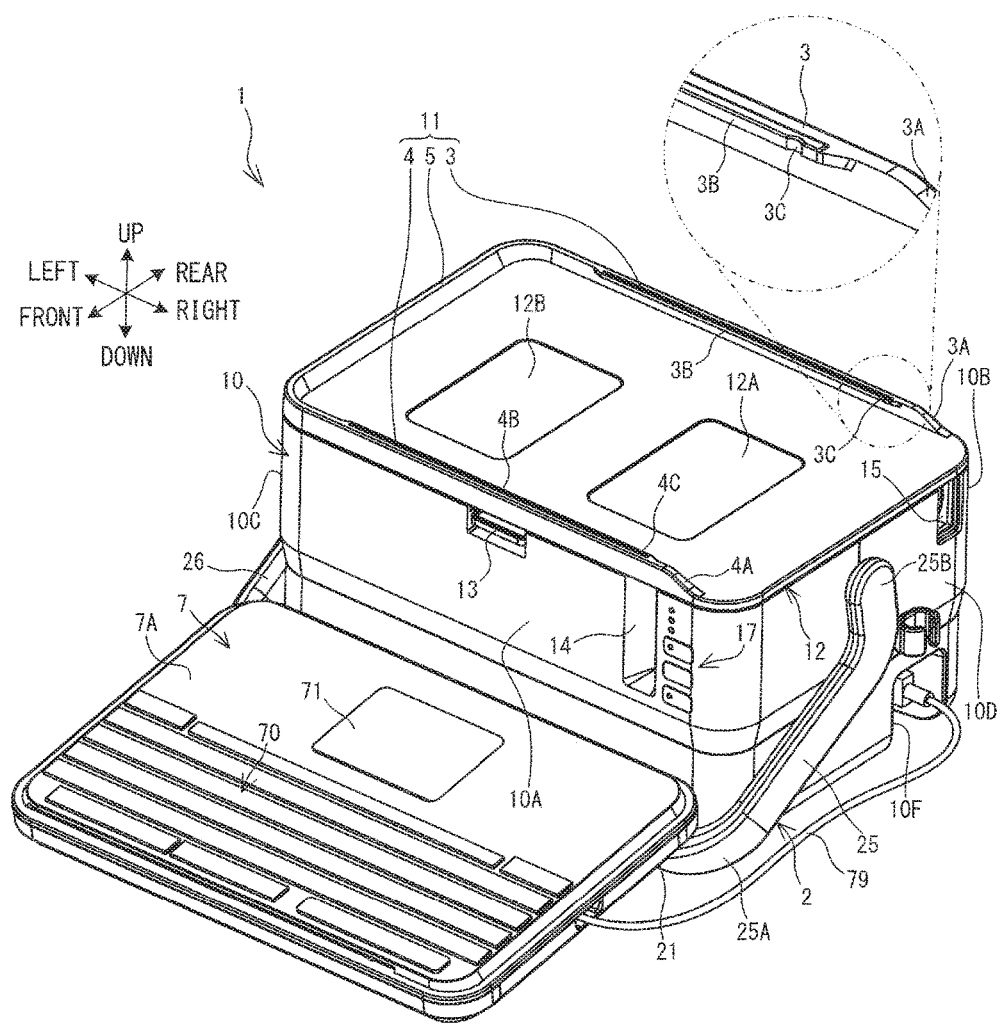
FIG. 3 is a perspective view of the print device 1 when a keyboard 7 is leaned against a handle 2, as viewed from the upper front right side.
Figure 4:
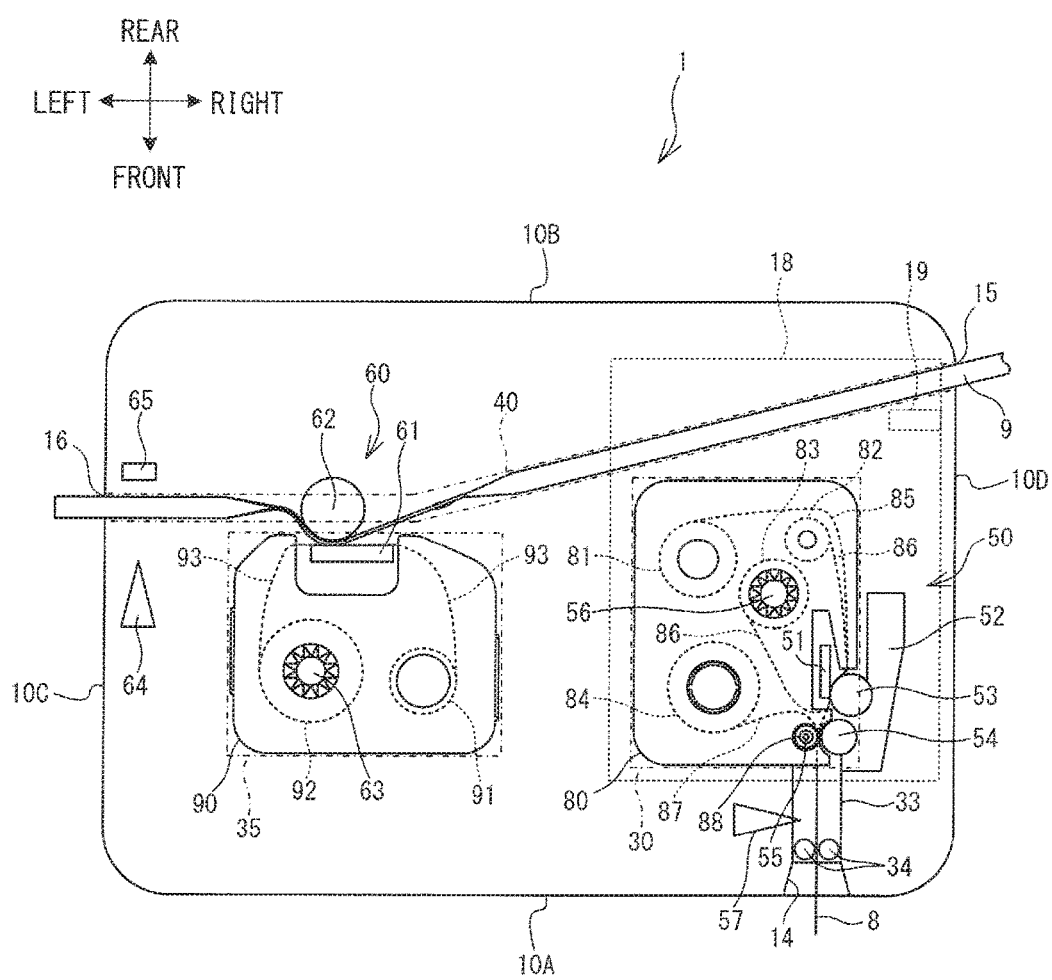
FIG. 4 is a plan view schematically showing an internal structure of the print device 1.

As shown in FIG. 1 to FIG. 3, the print device 1 is provided with two printing mechanisms and can respectively print a tape 8 (refer to FIG. 4) that is a strip-shaped print medium, and the tube 9 (refer to FIG. 4) that is a cylindrical print medium. The print device 1 is provided with a housing 10 and a cover 12. The housing 10 is a cuboid box-shaped member that is long in the left-right direction. The housing 10 has a plurality of side surfaces, namely, a front surface 10A and a rear surface 10B that face each other in the front-rear direction, and a left surface 10C and a right surface 10D that face each other in the left-right direction. The housing 10 houses a tape printing mechanism 50 (refer to FIG. 4), a tube printing mechanism 60 (refer to FIG. 4), a control board 18 and the like. The tape mounting portion 30, the ribbon mounting portion 35 and the tube mounting portion 40 are provided in an upper portion inside the housing 10, and each of them is open in an upper surface 10E of the housing 10.

The cover 12 is a plate-shaped member that is disposed on the upper side of the housing 10. A rear end portion of the cover 12 is supported on the upper side of a rear end portion of the housing 10 such that it can pivot around a rotation axis C (refer to FIG. 2) that extends in the left-right direction. A front end portion side of the cover 12 pivots up and down along a circumferential direction A (refer to FIG. 2) of the rotation axis C, and thus the cover 12 opens and closes an opening of the upper surface 10E of the housing 10. A lock mechanism 13 is provided on the upper side of a front end portion of the housing 10. When the cover 12 is closed with respect to the housing 10, the lock mechanism 13 locks the front end portion of the cover 12 and restricts the opening of the cover 12.

When the cover 12 is closed with respect to the housing 10 (refer to FIG. 1), the cover 12 covers the upper surface 10E (refer to FIG. 2) of the housing 10. When the cover 12 is to be opened, the print device 1 releases the locking of the cover 12 in response to the lock mechanism 13 being operated, and causes the cover 12 to pivot upward from the lock mechanism 13. When the cover 12 is open with respect to the housing 10 (refer to FIG. 2), the upper surface 10E of the housing 10 is exposed upward.

As shown in FIG. 3, an upper surface of the cover 12 is substantially flat. Two window portions 12A and 12B are provided in the upper surface of the cover 12. When the cover 12 is closed, a user can confirm the mounted state of the tape cassette 80 and the ribbon cassette 90 through the window portions 12A and 12B. A mounting portion 11 is provided on an upper portion of the cover 12. A keyboard 7 is detachably mounted on the mounting portion 11. The mounting portion 11 is provided with a pair of holding portions 3 and 4 and a restriction portion 5.

Figure 7:
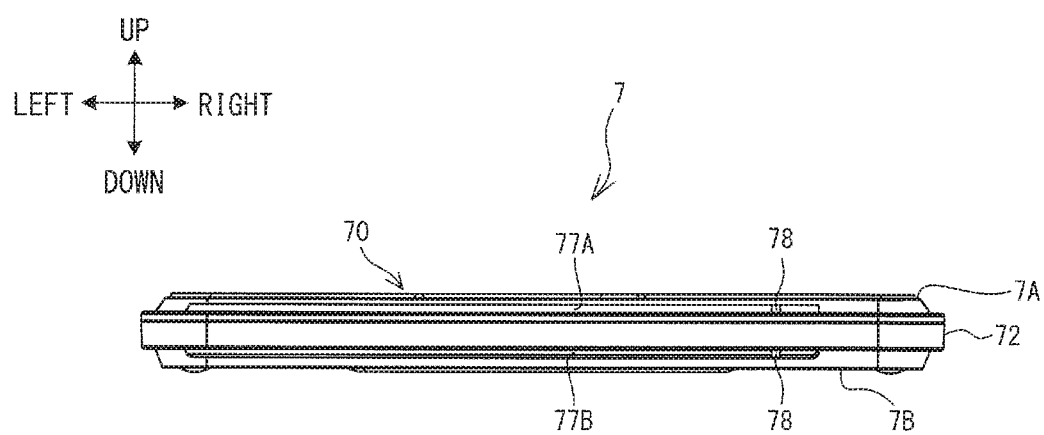
FIG. 7 is a front view of the keyboard 7.
Figure 8:
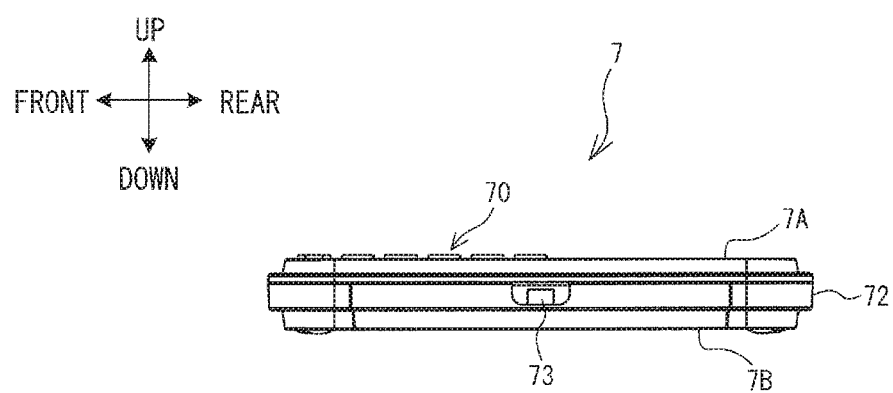
FIG. 8 is a right side view of the keyboard 7.
Figure 9:
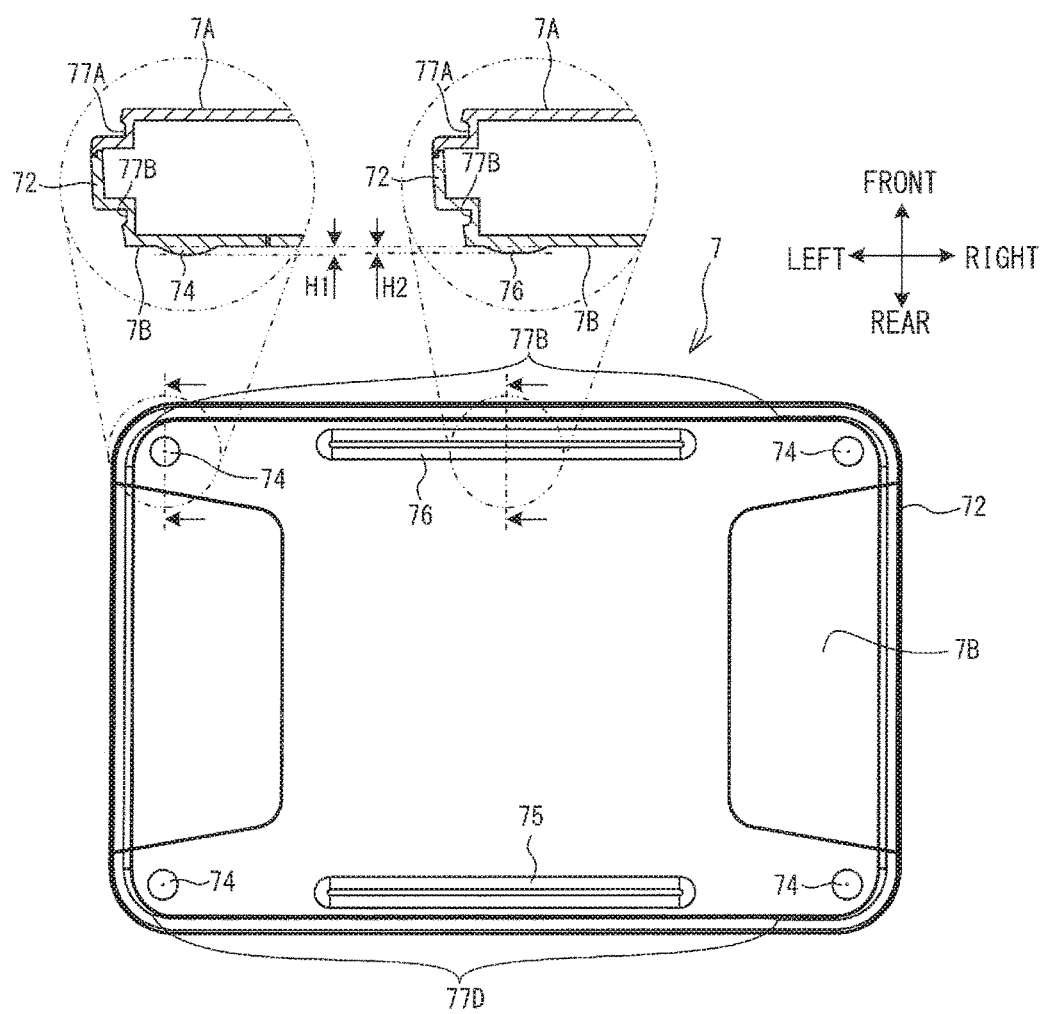
FIG. 9 is a bottom view of the keyboard 7.

The holding portion 3 is provided on an end portion on the rear side of the upper surface of the cover 12. The holding portion 3 has a wall shape and stands upward over substantially the entire length of the cover 12 in the left-right direction. An upper surface of the holding portion 3 is gently inclined at an end portion 3A on the right side of the holding portion 3, and connects to the upper surface of the cover 12. A collar portion 3B that protrudes forward is formed on the upper end of the holding portion 3. The collar portion 3B is provided substantially at the center of the holding portion 3 in the left-right direction, and has a length that is equal to or more than one third of the length of the cover 12 in the left-right direction, and less than the length of the cover 12 in the left-right direction. The length of the collar 3B in the example shown in FIG. 3 is three quarters of the length of the cover 12 in the left-right direction. When the keyboard 7 is mounted on the mounting portion 11 with a main surface 7A directed upward, the collar portion 3B is engaged with a groove portion 77D (refer to FIG. 9) on the lower side of a rear surface of the keyboard 7. A front surface of the collar portion 3B is gently inclined at both end portions of the collar portion 3B in the left-right direction, and connects to a front surface of the holding portion 3. A cut-out portion 3C, a front surface of which is cut out to a shape that is recessed rearward, is formed in a position close to a right end portion of the collar portion 3B. When the keyboard 7 is mounted on the mounting portion 11, one of protruding portions 78 (refer to FIG. 7) of the keyboard 7 is engaged with the cut-out portion 3C, and the keyboard 7 is inhibited from becoming disengaged from the mounting portion 11.

The holding portion 4 is provided on an end portion on the front side of the upper surface of the cover 12. The holding portion 4 has a wall shape and forms a pair with the holding portion 3. An end portion 4A on the right side of the holding portion 4 is inclined, and connects an upper surface of the holding portion 4 to the upper surface of the cover 12. A collar portion 4B, which protrudes rearward and forms a pair with the collar portion 3B, is formed on the upper end of the holding portion 4, substantially at the center of the holding portion 4 in the left-right direction. The collar portion 4B has a length that is equal to or more than one third of the length of the cover 12 in the left-right direction, and less than the length of the cover 12 in the left-right direction. The length of the collar 4B in the example shown in FIG. 3 is three quarters of the length of the cover 12 in the left-right direction. When the keyboard 7 is mounted on the mounting portion 11 with the main surface 7A directed upward, the collar portion 4B is engaged with a groove portion 77B (refer to FIG. 9) on the lower side of a front surface of the keyboard 7. Both end portions of the collar portion 4B in the left-right direction are inclined, and each connect a rear surface of the collar portion 4B to a rear surface of the holding portion 4. A cut-out portion 4C, a rear surface of which is cut out to a shape that is recessed forward, is formed in a position close to a right end portion of the collar portion 4B. When the keyboard 7 is mounted on the mounting portion 11, another one of the protruding portions 78 (refer to FIG. 7) of the keyboard 7 is engaged with the cut-out portion 4C.

The restriction portion 5 is provided on an end portion on the left side of the upper surface of the cover 12. The restriction portion 5 has a wall shape and stands upward over substantially the entire length of the cover 12 in the front-rear direction. Both end portions of the restriction portion 5 in the front-rear direction respectively connect to a left end portion of the holding portion 3 and a left end portion of the holding portion 4. More specifically, the mounting portion 11 is configured to surround the upper surface of the cover 12 such that it is continuous with front, rear and left end portions among four end portions of the upper surface of the cover 12. Heights (lengths in the up-down direction) of the holding portions 3 and 4 and the restriction portion 5 are substantially the same over the entire periphery.

A tape discharge opening 14, a tube insertion opening 15, a tube discharge opening 16 (refer to FIG. 2), a user interface portion 17 and a handle 2 are provided in side surfaces of the housing 10. The tape discharge opening 14 is an opening to discharge the tape 8 to the outside of the housing 10. The tape discharge opening 14 is provided in an upper right portion of the front surface 10A, and has a rectangular shape that is long in the up-down direction.

The tube insertion opening 15 is an opening to guide the tube 9 to the inside of the housing 10. The tube insertion opening 15 is provided in an upper portion on the rear side of the right surface 10D, and has a rectangular shape that is slightly longer in the up-down direction. The tube discharge opening 16 is an opening to discharge the tube 9 to the outside of the housing 10. The tube discharge opening 16 is provided in an upper portion on the rear side of the left surface 10C, and has a rectangular shape that is slightly longer in the up-down direction. The tube discharge opening 16 is slightly to the front of the tube insertion opening 15.

The user interface portion 17 includes a display portion and an operation portion. The display portion is a plurality of LEDs that indicate an operational state of the print device 1. The operation portion is a plurality of operation buttons including a power button and a start button. The user interface portion 17 is provided on the front surface 10A, to the right of the tape discharge opening 14.

The handle 2 is a member that is gripped when the user carries the print device 1. The handle 2 is provided with a grip portion 21 and a pair of support portions 25 and 26. The grip portion 21 extends in the left-right direction and is slightly longer than the length in the left-right direction of the housing 10 and the keyboard 7. The grip portion 21 is a section that is gripped when the user carries the print device 1. The support portion 25 has one end portion 25A that is connected to a right end portion 21A of the grip portion 21, and extends in a direction orthogonal to the grip portion 21. The support portion 26 has one end portion 26A that is connected to a left end portion 21B of the grip portion 21, and extends in the direction orthogonal to the grip portion 21 in parallel with the support portion 25. The right end portion 21A and the left end portion 21B of the grip portion 21 are bent in a gently curved shape, and are connected to the support portions 25 and 26, respectively. Another end portion 25B of the support portion 25 is attached to an upper portion of the right surface 10D, at a substantially central position in the front-rear direction, and is supported such that it can pivot around a pivot shaft R (refer to FIG. 1) that extends in the left-right direction. In a similar manner, another end portion 26B (refer to FIG. 5) of the support portion 26 is attached to an upper portion of the left surface 10C, at a substantially central position in the front-rear direction, and is supported such that it can pivot around the pivot shaft R that is coaxial with the support portion 25. In other words, the handle 2 is provided as a bridge between the left surface 10C and the right surface 10D, and the grip portion 21 can move up and down with respect to the housing 10 due to the pivoting of the support portions 25 and 26.

A rotation inhibiting mechanism 45 (refer to FIG. 5) is provided at an engagement section of the housing 10 and the pivot shaft R of the handle 2. The rotation inhibiting mechanism 45 causes the grip portion 21 to move between a first position P1 that is above the mounting portion 11 of the cover 12 and a second position P2 that is below the mounting portion 11. The first position P1 is located at substantially the center of the housing 10 in the front-rear direction. The second position P2 is located to the front of and below the housing 10. The grip portion 21 moves between the first position P1 and the second position P2 passing through a position diagonally to the front of and above the housing 10. Note that, in FIG. 1, a mode of the handle 2 when the grip portion 21 is positioned in the first position P1 is shown by a dashed line, and a mode of the handle 2 when the grip portion 21 is positioned in the second position P2 is shown by a solid line.

Figure 5:
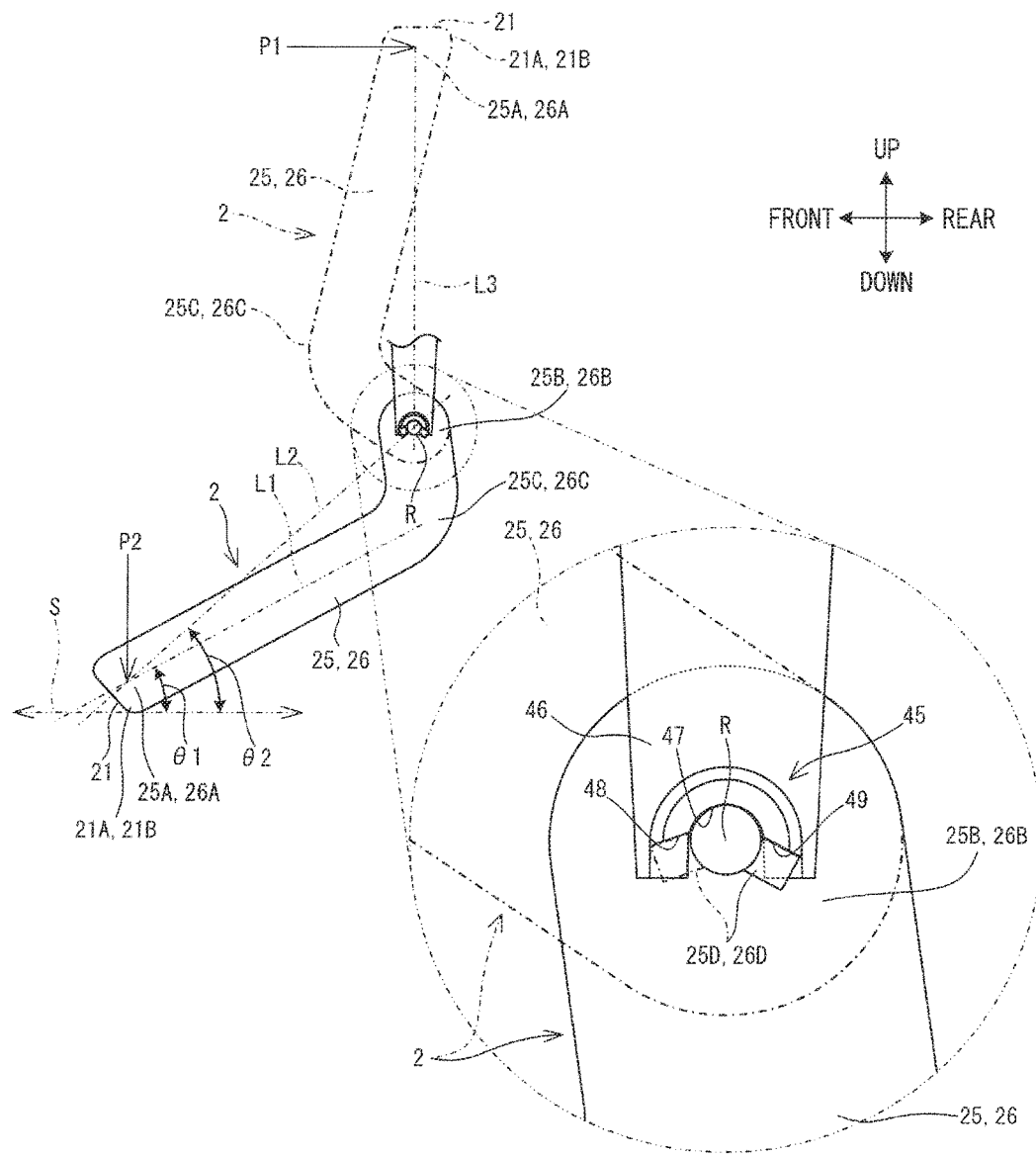
FIG. 5 is a side view schematically showing a rotation inhibiting mechanism 45 of the handle 2.
Figure 6:
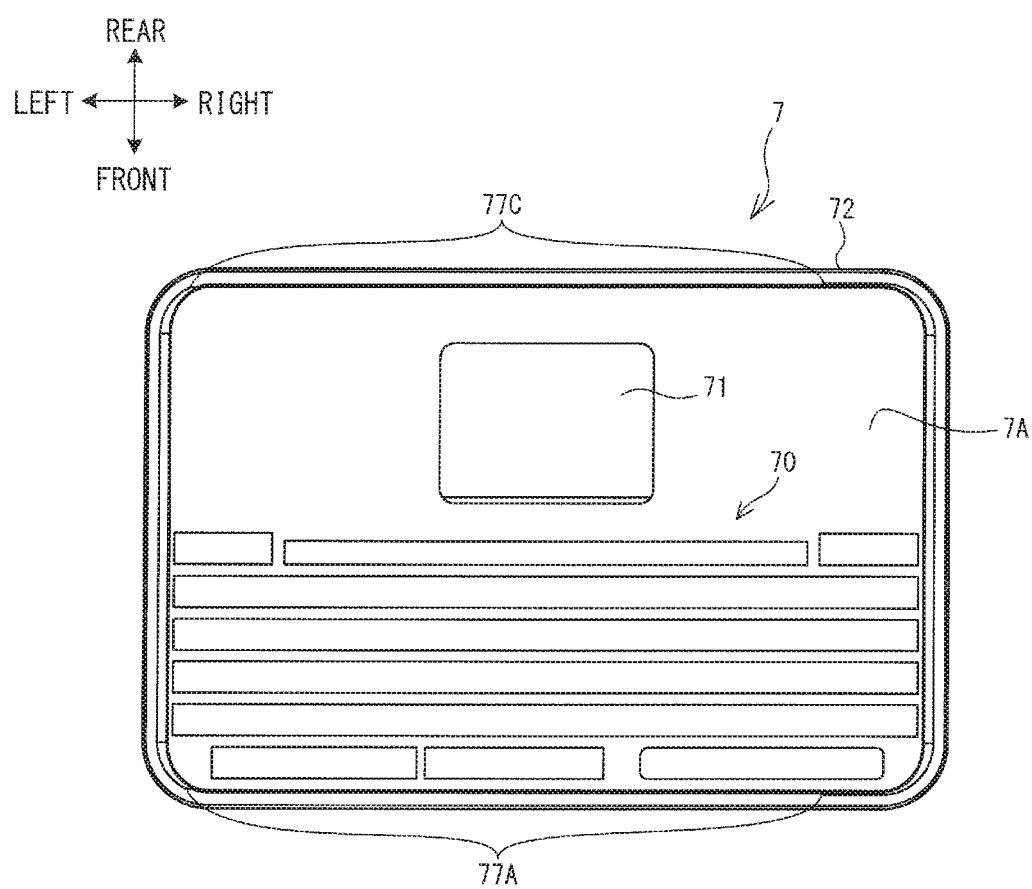
FIG. 6 is a plan view of the keyboard 7.

As shown in FIG. 5, an inhibition member 46 provided on the housing 10 operates together with lock pins 25D and 26D that are respectively provided on the pivot shaft R of the support portions 25 and 26, and the rotation inhibiting mechanism 45 restricts a pivotable range of the support portions 25 and 26. The inhibition member 46 is provided with a bearing portion 47, a first lock portion 48 and a second lock portion 49. The bearing portion 47 is a portion having a semi-circular arc-shaped inner peripheral surface, and engages with an outer peripheral surface of the pivot shaft R from above. The first lock portion 48 has a surface that is directed downward on the front side of the bearing portion 47. The second lock portion 49 has a surface that is directed downward on the rear side of the bearing portion 47. The lock pins 25D and 26D protrude in a radial direction from the outer peripheral surface of the pivot shaft R.

When the grip portion 21 moves upward, the support portions 25 and 26 can pivot until the lock pins 25D and 26D come into contact with the first lock portion 48. When the lock pins 25D and 26D respectively come into contact with the first lock portion 48, the grip portion 21 is positioned in the first position P1. When the grip portion 21 moves downward, the support portions 25 and 26 can pivot until the lock pins 25D and 26D come into contact with the second lock portion 49. When the lock pins 25D and 26D respectively come into contact with the second lock portion 49, the grip portion 21 is positioned in the second position P2. In this manner, the rotation inhibiting mechanism 45 restricts the grip portion 21 from moving further rearward than the first position P1, and also restricts the grip portion 21 from moving further downward than the second position P2.

As shown in FIG. 1 to FIG. 3 and FIG. 5, the support portions 25 and 26 respectively have bent portions 25C and 26C in positions closer to the other end portions 25B and 26B than the one end portions 25A and 26A. When the grip portion 21 is positioned in the first position P1, the bent portions 25C and 26C are bent such that their vertices project in the front-rear direction. At the bent portions 25C and 26C, the support portions 25 and 26 bulge and extend at positions displaced from a virtual line that connects the pivot shaft R and the grip portion 21.

As shown in FIG. 5, when the grip portion 21 is positioned in the second position P2, the support portions 25 and 26 extend downward from the other end portions 25B and 26B toward the bent portions 25C and 26C, and extend diagonally forward and downward from the bent portions 25C and 26C toward the end portions 25A and 26A. $\theta 1$ is an angle at which a virtual line L1 that connects the bent portions 25C and 26C and the one end portions 25A and 26A is inclined with respect to a flat surface S that is orthogonal to the up-down direction. $\theta 2$ is an angle at which a virtual line L2 that connects the other end portions 25B and 26B (the pivot shaft R) and the one end portions 25A and 26A is inclined with respect to the flat surface S. When the grip portion 21 is positioned in the second position P2, the bent portions 25C and 26C are positioned lower than the other end portions 25B and 26B. Therefore, the angle $\theta 1$ is smaller than the angle $\theta 2$. In this manner, since the support portions 25 and 26 have the bent portions 25C and 26C, the support portions 25 and 26 are inclined with respect to the flat surface S at the smaller angle $\theta 1$.

When the grip portion 21 is positioned in the first position P1, a virtual line L3 that connects the other end portions 25B and 26B (the pivot shaft R) and the one end portions 25A and 26A is substantially along the up-down direction. As shown in FIG. 1, the other end portions 25B and 26B of the support portions 25 and 26 are respectively attached to upper portions of the right surface 10D and the left surface 10C, at a substantially central position in the front-rear direction. A universal serial bus (USB) cable 79 that connects the keyboard 7 and the housing 10 is pulled out to the right of the housing 10 from a substantially central position in the front-rear direction of the keyboard 7 when the keyboard 7 is mounted on the mounting portion 11. In this manner, since the support portions 25 and 26 have the bent portions 25C and 26C, it is possible to avoid interference with the USB cable 79 of the keyboard 7 when the grip portion 21 is positioned in the first position P1.

As described above, the rotation inhibiting mechanism 45 restricts the grip portion 21 from moving further rearward than the first position P1. It is therefore possible to inhibit the handle 2 from interfering with the USB cable 79 of the keyboard 7 due to the pivoting of the support portions 25 and 26. Further, the tube insertion opening 15 is provided in the upper portion on the rear side of the right surface 10D of the housing 10, and the tube discharge opening 16 is provided in the upper portion on the rear side of the left surface 10C. Owing to the rotation inhibiting mechanism 45, the grip portion 21 does not move further rearward than the first position P1. Thus, the rotation inhibiting mechanism 45 also inhibits interference between the tube 9, which is inserted from the tube insertion opening 15 and discharged from the tube discharge opening 16, and the handle 2 due to the pivoting of the support portions 25 and 26.

As shown in FIG. 1 and FIG. 2, the grip portion 21 has a concave portion 22 and a pair of concave portions 23 in a surface that is directed upward when the grip portion 21 is positioned in the second position P2. The concave portion 22 is formed at substantially the center in the left-right direction of the grip portion 21, and extends in the left-right direction. The concave portion 22 has an oval shape in a plan view, each of both end portions of the concave portion 22 has a halved hemispherical shape, and an intermediate portion of the concave portion 22 has a half-cylindrical shape. A protruding portion 75 (refer to FIG. 9) of the keyboard 7 engages with the concave portion 22. The pair of concave portions 23 are respectively formed at end portions on both sides of the grip portion 21 in the left-right direction. The concave portions 23 have a hemispherical shape. The keyboard 7 has four legs 74 (which will be described later), and two of the four legs 74 (refer to FIG. 9) that are provided on the rear side engage with the pair of concave portions 23, respectively.

As shown in FIG. 2 and FIG. 4, the tape mounting portion 30, the ribbon mounting portion 35, the tube mounting portion 40 and the like are provided in the upper portion inside the housing 10. The tape cassette 80 can be attached to and detached from the tape mounting portion 30. The tape mounting portion 30 is a recessed portion that is open in the upper surface 10E, and has an opening shape substantially corresponding to an outer shape of the tape cassette 80 in a plan view. The tape mounting portion 30 of the present embodiment is provided in a right portion of the upper surface 10E and to the front of the tube mounting portion 40. In a state in which the tape cassette 80 is mounted in the tape mounting portion 30, the width direction of various tapes and an ink ribbon housed in the tape cassette 80 is substantially parallel to the up-down direction (refer to FIG. 1).

As shown in FIG. 4, a feed path 33 is a groove portion that extends forward continuously from a front right portion of the tape mounting portion 30. A front end portion of the feed path 33 is connected to the tape discharge opening 14. The tape guide 34 is provided in the feed path 33, on the rear side of the tape discharge opening 14. The tape guide 34 is a pair of rollers that are disposed facing each other in the left-right direction. The rollers are rotating bodies that can rotate around an axial line orthogonal to a bottom surface of the housing 10. A gap, through which the tape 8 can pass, is formed between the pair of rollers. If a design change is made to the tape guide 34 in order to change the direction in which the pair of rollers feed the tape 8, it is possible to change the direction in which the tape 8 is discharged from the tape discharge opening 14.

The ribbon cassette 90 can be attached to and detached from the ribbon mounting portion 35. The ribbon mounting portion 35 is a recessed portion that is open in the upper surface 10E, and is formed to have an opening shape substantially corresponding to an outer shape of the ribbon cassette 90 in a plan view. The ribbon mounting portion 35 of the present embodiment is provided in a left portion of the upper surface 10E and to the front of the tube mounting portion 40. More specifically, the tape mounting portion 30 and the ribbon mounting portion 35 are disposed along a tube feed direction such that they are arranged side by side in the left-right direction. Substantially the whole of the tape mounting portion 30 overlaps with substantially the whole of the ribbon mounting portion 35 in the left-right direction.

The tube 9 can be attached to and detached from the tube mounting portion 40. The tube mounting portion 40 is a groove portion that is open in the upper surface 10E, and extends from the tube insertion opening 15 to the tube discharge opening 16. Since the tube discharge opening 16 is disposed slightly to the front of the tube insertion opening 15, the tube mounting portion 40 tilts slightly leftward and forward and extends substantially in the left-right direction. A rear end portion of the ribbon mounting portion 35 is connected spatially to the tube mounting portion 40 on the right side of the tube discharge opening 16. The direction in which the tube mounting portion 40 extends from the tube insertion opening 15 to the tube discharge opening 16 is referred to as the tube feed direction. A groove width of the tube mounting portion 40 that is orthogonal to the tube feed direction is slightly larger than an outer diameter of the tube 9, except a section where the tube mounting portion 40 and the ribbon mounting portion 35 are connected spatially. In a state in which the cover 12 is opened, the user can mount the tube 9 in the tube mounting portion 40 from above. The user disposes the tube 9 along the tube feed direction such that the tube 9 extends from the tube insertion opening 15 to the tube discharge opening 16, and thus mounts the tube 9 in the tube mounting portion 40.

The control board 18, the tape printing mechanism 50, the tube printing mechanism 60, the tape cassette 80 and the ribbon cassette 90 will be described with reference to FIG. 4. The control board 18 is a board on which a CPU, a ROM, a RAM, a CGROM and the like (which are not shown in the drawings) are provided, and controls various operations of the print device 1. For example, the control board 18 controls a printing operation of each of the tape printing mechanism 50 and the tube printing mechanism 60. The control board 18 of the present embodiment is provided on a lower right portion inside the housing 10 (refer to FIG. 2). The control board 18 is provided with a USB connector 19 (refer to FIG. 2) to which the USB cable 79 of the keyboard 7 is connected. The USB connector 19 is exposed inside a plug housing portion 10F (refer to FIG. 2) that is formed in a recessed shape, at a position toward the rear, in a lower portion of the right surface 10D of the housing 10. A plug of the USB cable 79 is inserted into the USB connector 19. A power source portion (not shown in the drawings) is also provided inside the housing 10. The power source portion is connected to a battery (not shown in the drawings) that is mounted inside the housing 10, or is connected to an external power source (not shown in the drawings) via a cord, and supplies power to the print device 1. A connector (not shown in the drawings) of the cord to connect to the external power source is also exposed inside the plug housing portion 10F.

The tape cassette 80 is a box-shaped body that can house at least the tape 8. The tape cassette 80 is a laminate type tape cassette that houses a film tape 85 and a double-sided adhesive tape 87, as the tape 8, and also houses an ink ribbon 86. A first tape roll 81, a ribbon roll 82, a ribbon take-up spool 83, a second tape roll 84 and a tape drive roller 88 are each rotatably supported inside the tape cassette 80.

The first tape roll 81 is the unused film tape 85 wound around a spool (not shown in the drawings). The ribbon roll 82 is the unused ink ribbon 86 wound around a spool (not shown in the drawings). The used ink ribbon 86 is wound around the ribbon take-up spool 83. The second tape roll 84 is the unused double-sided adhesive tape 87 wound around a spool (not shown in the drawings). The tape drive roller 88 feeds the tape 8.

The tape printing mechanism 50 includes a print head 51, a platen holder 52, a platen roller 53, a movable feed roller 54, a tape drive shaft 55, a ribbon take-up shaft 56, a cutter 57, a first drive motor (not shown in the drawings), a cutter motor (not shown in the drawings), a second drive motor (not shown in the drawings) and the like. The print head 51, the tape drive shaft 55 and the ribbon take-up shaft 56 are each provided so as to stand upward from the bottom surface of the tape mounting portion 30. The print head 51 is a thermal head that includes a heating body (not shown in the drawings), and is provided in the front right portion of the tape mounting portion 30. The tape drive shaft 55 can rotate the tape drive roller 88. The ribbon take-up shaft 56 can rotate the ribbon take-up spool 83. The first drive motor (not shown in the drawings) rotationally drives the tape drive shaft 55 and the ribbon take-up shaft 56.

The platen roller 53 can rotate relative to the print head 51. The movable feed roller 54 can rotate relative to the tape drive shaft 55. The platen roller 53 and the movable feed roller 54 are rotatably supported at the leading end of the platen holder 52. The platen holder 52 is disposed on the right side of the tape mounting portion 30, and can be displaced between an operating position and a retracted position in accordance with the opening and closing of the cover 12 (refer to FIG. 1). When the platen holder 52 is in the operating position, the platen roller 53 and the movable feed roller 54 are disposed on the inside of the tape mounting portion 30. When the platen holder 52 is in the retracted position, the platen roller 53 and the movable feed roller 54 are disposed on the outside of the tape mounting portion 30. The cutter 57 is provided to the rear of the tape guide 34, and can cut the tape 8 on the feed path 33. The cutter motor (not shown in the drawings) drives the cutter 57. The second drive motor (not shown in the drawings) rotationally drives the pair of rollers of the tape guide 34.

When the cover 12 is opened (refer to FIG. 2), the platen holder 52 is displaced to the retracted position. When the tape cassette 80 is mounted in the tape mounting portion 30, the tape drive shaft 55 and the ribbon take-up shaft 56 are respectively inserted into the tape drive roller 88 and the ribbon take-up spool 83. After that, when the cover 12 is closed, the platen holder 52 is displaced to the operating position. The platen roller 53 causes the unused film tape 85 and the unused ink ribbon 86 to be superimposed with each other, and urges them toward the print head 51. The printed film tape 85 and the unused double-sided adhesive tape 87 are clamped between the movable feed roller 54 and the tape drive roller 88.

The tape printing mechanism 50 performs the following printing operations in accordance with control of the control board 18. The first drive motor of the tape printing mechanism 50 rotates the tape drive shaft 55 and the ribbon take-up shaft 56, and thereby rotates the tape drive roller 88 and the ribbon take-up spool 83. In accordance with the rotation of the tape drive roller 88, the film tape 85 is pulled out from the first tape roll 81, and the double-sided adhesive tape 87 is pulled out from the second tape roll 84. In accordance with the rotation of the ribbon take-up spool 83, the ink ribbon 86 is pulled out from the ribbon roll 82. The film tape 85 and the ink ribbon 86 that have been pulled out are fed to a position between the print head 51 and the platen roller 53.

Using the ink ribbon 86, the print head 51 performs mirror image printing and prints characters on the film tape 85. The print head 51 of the present embodiment prints characters on the left surface of the film tape 85 that passes through the right side of the print head 51. The used ink ribbon 86 is taken up by the ribbon take-up spool 83. The printed film tape 85 is fed to a position between the movable feed roller 54 and the tape drive roller 88, and the pulled out double-sided adhesive tape 87 is adhered to the printed film tape 85. In this manner, the tape 8 obtained by adhering the double-sided adhesive tape 87 to a print surface of the film tape 85 is created. In the created tape 8, the characters appear on a surface on the opposite side to the print surface of the film tape 85.

Further, the tape 8 passes through the inside of the feed path 33, and is fed forward as far as the tape guide 34. The second drive motor of the tape printing mechanism 50 rotationally drives the pair of rollers of the tape guide 34, and feeds the tape 8 further forward. The fed tape 8 is discharged forward from the tape discharge opening 14 in a posture in which the width direction of the tape 8 is substantially parallel to the up-down direction. At this time, the tape 8 is discharged forward from the front surface 10A such that the print surface of the tape 8 is directed rightward. The cutter motor of the tape printing mechanism 50 drives the cutter 57, and cuts the tape 8 behind the tape guide 34. The cut tape 8 (a so-called label) falls to the front of the housing 10.

The ribbon cassette 90 is a box-shaped body that can house an ink ribbon 93. A ribbon roll 91 and a ribbon take-up spool 92 are each rotatably supported inside the ribbon cassette 90. The ribbon roll 91 is the unused ink ribbon 93 wound around a spool (not shown in the drawings). The used ink ribbon 93 is wound around the ribbon take-up spool 92.

The tube printing mechanism 60 includes a print head 61, a movable feed roller 62, a ribbon take-up shaft 63, a cutter 64, a blade receiving plate 65, a drive motor (not shown in the drawings), a cutter motor (not shown in the drawings) and the like. The print head 61 and the ribbon take-up shaft 63 are each provided so as to stand upward from the bottom surface of the ribbon mounting portion 35. The print head 61 is a thermal head that includes a heating body (not shown in the drawings), and is provided in a rear portion of the ribbon mounting portion 35. The ribbon take-up shaft 63 can rotate the ribbon take-up spool 92.

The movable feed roller 62 can rotate relative to the print head 61. The movable feed roller 62 is disposed on the rear side of the ribbon mounting portion 35, and can be displaced between an operating position and a retracted position in accordance with the opening and closing of the cover 12 (refer to FIG. 1). When the movable feed roller 62 is in the operating position, the movable feed roller 62 is disposed on the inside of the tube mounting portion 40 and comes close to the print head 61. When the movable feed roller 62 is in the retracted position, the movable feed roller 62 is disposed on the rear side of the tube mounting portion 40, and is separated from the print head 61. The drive motor (not shown in the drawings) rotationally drives the movable feed roller 62 and the ribbon take-up shaft 63.

The cutter 64 and the blade receiving plate 65 are provided on the upstream side in the tube feed direction relative to the tube discharge opening 16, and on the downstream side in the tube feed direction relative to the ribbon mounting portion 35. The cutter 64 and the blade receiving plate 65 are provided so as to face each other, with the tube mounting portion 40 interposed therebetween. By the cutter 64 moving toward the blade receiving plate 65, the cutter 64 can press the tube 9 in the tube mounting portion 40 against the blade receiving plate 65 and can cut the tube 9. The cutter motor (not shown in the drawings) drives the cutter 64.

When the cover 12 is opened, the movable feed roller 62 is displaced to the retracted position. When the ribbon cassette 90 is mounted in the ribbon mounting portion 35, the ribbon take-up shaft 63 is inserted into the ribbon take-up spool 92. After that, when the cover 12 is closed, the movable feed roller 62 is displaced to the operating position. The movable feed roller 62 causes the tube 9 in the tube mounting portion 40 and the unused ink ribbon 93 to be superimposed with each other, and urges them toward the print head 61. At this time, the tube 9 is elastically deformed by the urging force of the movable feed roller 62, and comes into surface-contact with the print head 61 via the ink ribbon 93.

The tube printing mechanism 60 performs the following printing operations in accordance with the control of the control board 18. The drive motor of the tube printing mechanism 60 rotates the movable feed roller 62 and the ribbon take-up shaft 63. In accordance with the rotation of the movable feed roller 62, the tube 9 in the tube mounting portion 40 is fed to the downstream side in the tube feed direction. At this time, the tube 9 before printing that is located outside the housing 10 is drawn into the inside of the tube mounting portion 40 from the right surface 10D via the tube insertion opening 15. The ribbon take-up spool 92 rotates in accordance with the rotation of the ribbon take-up shaft 63, and thus the ink ribbon 93 is pulled out from the ribbon roll 91.

Using the ink ribbon 93 that has been pulled out, the print head 61 prints characters on the tube 9 that is being fed. The print head 61 of the present embodiment performs normal image printing and prints the characters on the front surface of the tube 9 that passes through the rear side of the print head 61. Therefore, the front surface of the tube 9 is the print surface of the tube 9. The used ink ribbon 93 is taken up by the ribbon take-up spool 92. The tube 9 after printing is fed from the movable feed roller 62 to the downstream side in the tube feed direction, and is discharged from the housing 10 via the tube discharge opening 16. At this time, the tube 9 is discharged leftward from the left surface 10C such that the print surface of the tube 9 is directed forward. The cutter motor of the tube printing mechanism 60 drives the cutter 64, and cuts the tube 9 on the upstream side in the tube feed direction relative to the tube discharge opening 16. The cut tube 9 falls to the left of the housing 10.

The keyboard 7 will be described with reference to FIG. 6 to FIG. 9. The orientation of the keyboard 7 in FIG. 6 to FIG. 9 corresponds to the orientation of the print device 1 in a state in which the keyboard 7 is mounted on the mounting portion 11 and the cover 12 is closed (refer to FIG. 1). The keyboard 7 has a substantially rectangular box shape that is long in the left-right direction in a plan view.

The height of the keyboard 7 in the up-down direction is higher than the height of the holding portions 3 and 4 and the restriction portion 5 of the mounting portion 11. The length of the keyboard 7 in the front-rear direction and the left-right direction is substantially the same as the length of the housing 10 in the front-rear direction and the left-right direction. The upwardly directed main surface 7A of the keyboard 7 is provided with an operation portion 70 that is formed by a plurality of keys to receive inputs, and a display portion 71 that displays information. The display portion 71 is, for example, a liquid crystal display. The user can edit characters, symbols, graphics and the like to be printed on the print medium, by operating the operation portion 70 while looking at display on the display portion 71.

A downwardly directed back surface 7B of the keyboard 7 is provided with the four legs 74 and two protruding portions, namely, the protruding portion 75 and a protruding portion 76. The four legs 74 are respectively provided in four corners of the back surface 7B, and each protrudes from the back surface 7B by a height H1 (refer to FIG. 9). The surfaces of the legs 74 are rounded. The legs 74 are formed integrally with the back surface 7B. The protruding portion 76 is provided between the two legs 74 provided on the front side of the back surface 7B, and extends in the left-right direction. The protruding portion 76 is disposed on an edge portion on the front side of the back surface 7B, and protrudes from the back surface 7B by a height H2 (refer to FIG. 9). The protruding portion 76 is positioned further to the front than the legs 74 on the front side of the back surface 7B. The protruding portion 75 is provided between the two legs 74 provided on the rear side of the back surface 7B, and extends in the front-rear direction. The protruding portion 75 is disposed on an edge portion on the rear side of the back surface 7B, and protrudes from the back surface 7B by the same height H2 as the protruding portion 76. The protruding portion 75 is positioned further to the rear than the legs 74 on the rear side of the back surface 7B. The surfaces of the protruding portions 75 and 76 are rounded. The protruding portions 75 and 76 are formed integrally with the back surface 7B. The height H1 by which the legs 74 protrude from the back surface 7B is higher than the height H2 by which the protruding portions 75 and 76 protrude from the back surface 7B. Therefore, when the keyboard 7 is placed on a flat surface, the four legs 74 are in contact with the flat surface and support the keyboard 7, and also maintain the protruding portions 75 and 76 in a state of being separated from the flat surface.

A coating, such as a resin, is applied to the back surface 7B of the keyboard 7. The coating is also applied to the surfaces of the four legs 74 and the protruding portions 75 and 76. As a result, when the legs 74 and the protruding portions 75 and 76 are placed on the flat surface, it is possible to obtain an anti-slip effect. Note that the four legs 74 and the protruding portions 75 and 76 may be provided on the keyboard 7 by adhering rubber feet or the like that are formed separately from the back surface 7B of the keyboard 7.

The keyboard 7 is provided with a bulging portion 72 substantially at the center in the up-down direction. The bulging portion 72 bulges outward around the keyboard 7 in the circumferential direction with respect to the up-down direction. A connection portion 73 (refer to FIG. 8), which connects the USB cable 79 to a board (not shown in the drawings) provided in the keyboard 7, is formed in a right surface of the bulging portion 72, at substantially the center in the front-rear direction. The USB cable 79 may be directly connected to the board in the keyboard 7 or may be detachably connected to the board via a connector.

A groove portion 77A, which is recessed rearward and extends in the left-right direction, is formed on the upper side of the bulging portion 72 on the front surface of the keyboard 7. A groove portion 77B, which is recessed rearward and extends in the left-right direction, is formed on the lower side of the bulging portion 72 on the front surface of the keyboard 7. The groove portions 77A and 77B are provided at positions that are symmetrical in the up-down direction with respect to the bulging portion 72. A groove portion 77C, which is recessed forward and extends in the left-right direction, is formed on the upper side of the bulging portion 72 on the rear surface of the keyboard 7. A groove portion 77D, which is recessed forward and extends in the left-right direction, is formed on the lower side of the bulging portion 72 on the rear surface of the keyboard 7. In a similar manner, the groove portions 77C and 77D are also provided at positions that are symmetrical in the up-down direction with respect to the bulging portion 72. The four groove portions 77A, 77B, 77C and 77D each extend to be longer, in the left-right direction, than the collar portions 3B and 4B of the mounting portion 11. The groove portion 77A and the groove portion 77C are provided at positions that are symmetrical in the front-rear direction such that the main surface 7A of the keyboard 7 is between them. The groove portion 77B and the groove portion 77D are provided at positions that are symmetrical in the front-rear direction such that the back surface 7B of the keyboard 7 is between them.

Figure 13:
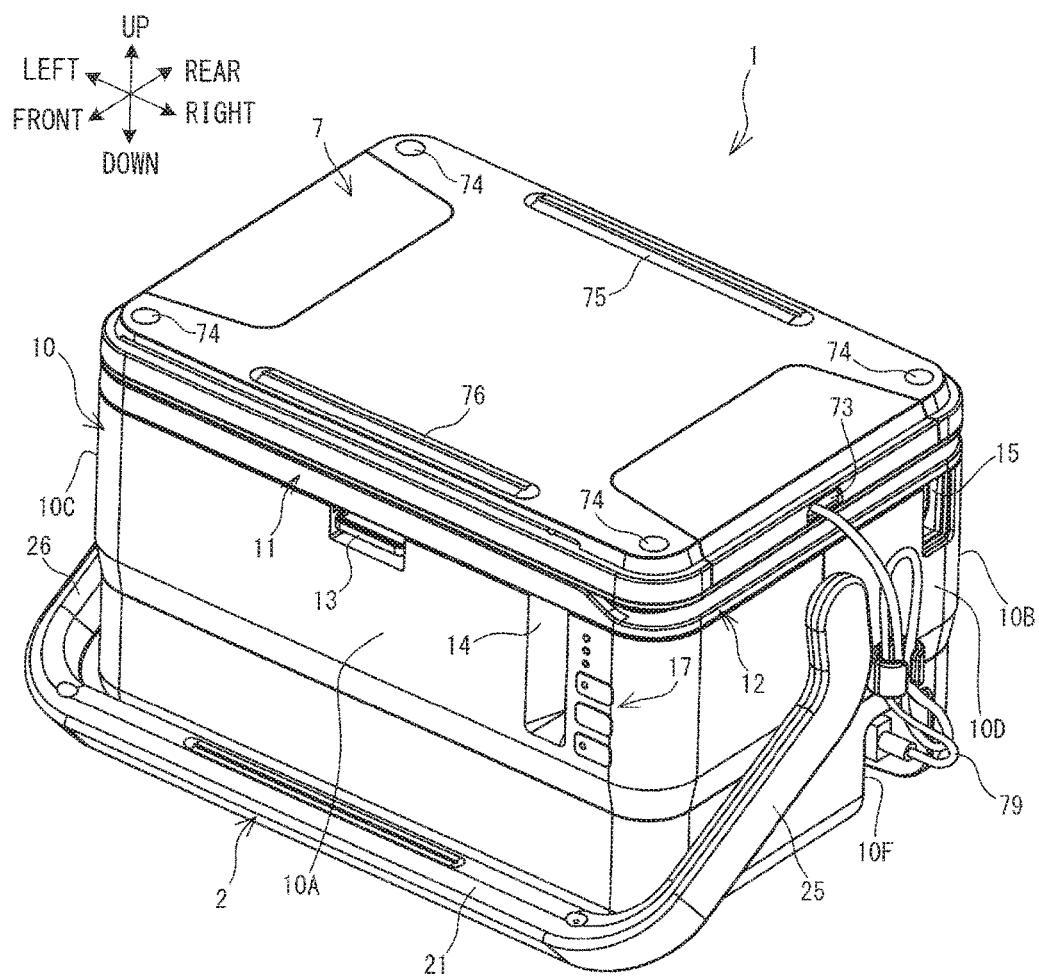
FIG. 13 is a perspective view of the print device 1 on which the keyboard 7 is mounted with a back surface 7B directed upward, as viewed from the upper front right side.

The four groove portions 77A, 77B, 77C and 77D each extend to be longer, in the left-right direction, than the collar portions 3B and 4B of the mounting portion 11. Left end portions of the four groove portions 77A, 77B, 77C and 77D are each formed in a left end portion of the keyboard 7. Right end portions of the four groove portions 77A, 77B, 77C and 77D are not formed in a right end portion of the keyboard 7, and each is formed at a position slightly closer to the center in the left-right direction than the right end portion of the keyboard 7. The keyboard 7 can be mounted on the mounting portion 11 such that the main surface 7A is directed upward (refer to FIG. 1). At this time, the collar portions 3B and 4B of the holding portions 3 and 4 are respectively engaged with the groove portions 77A and 77B. The user can perform an operation on the operation portion 70 in a state in which the keyboard 7 is mounted on the mounting portion 11, and can edit characters, symbols, graphics and the like to be printed on the print medium. The keyboard 7 can be mounted on the mounting portion 11 such that the back surface 7B is directed upward (refer to FIG. 13). At this time, the collar portions 3B and 4B of the holding portions 3 and 4 are respectively engaged with the groove portions 77A and 77C. The print device 1 can protect the operation portion 70 of the keyboard 7 from coming into contact with an external object.

The connection portion 73 of the USB cable 79 is provided substantially at the center in the front-rear direction of the right end portion of the keyboard 7. Therefore, even when the keyboard 7 is mounted on the mounting portion 11 such that the main surface 7A and the back surface 7B are inverted, it is difficult for the USB cable 7 to become entangled with the keyboard 7 and the housing 10. Further, even when the keyboard 7 is mounted on the mounting portion 11 such that the main surface 7A and the back surface 7B are inverted, the connection portion 73 can be positioned substantially at the center in the front-rear direction of the housing 10. Thus, as described above, it is possible to avoid the interference between the support portion 25 of the handle 2 and the USB cable 79, owing to the bent portion 25C.

Each of the four groove portions 77A, 77B, 77C and 77D has the protruding portion 78 that protrudes from the groove bottom inside the groove, at a position close to the right end portion of each of them. When the keyboard 7 is mounted on the mounting portion 11, the protruding portions 78 are engaged with the cut-out portions 3C and 4C (refer to FIG. 3) formed in the collar portions 3B and 4B of the holding portions 3 and 4, and thus the keyboard 7 is inhibited from becoming disengaged from the mounting portion 11.

Figure 10:
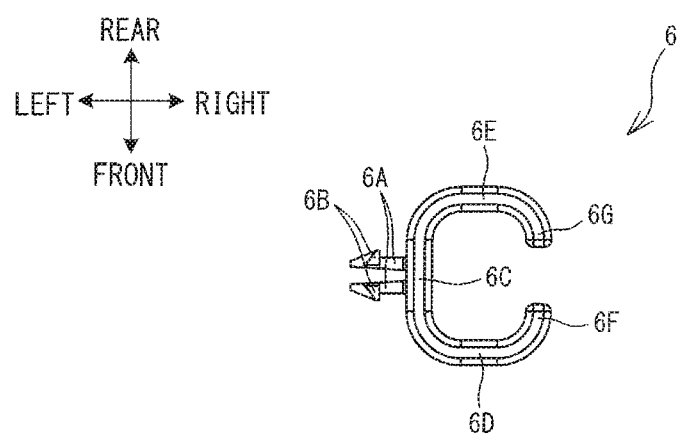
FIG. 10 is a plan view of a cable clip 6.
Figure 11:
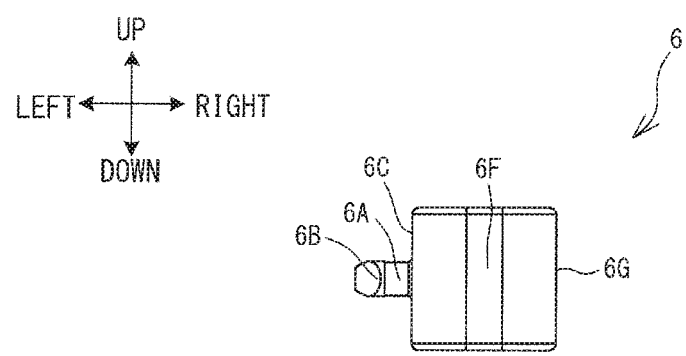
FIG. 11 is a front view of the cable clip 6.
Figure 12:
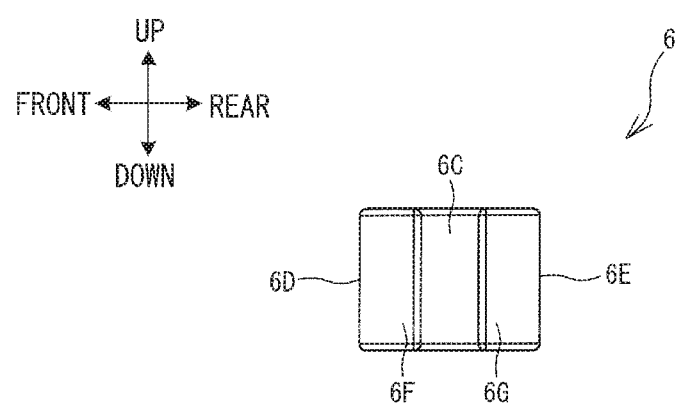
FIG. 12 is a right side view of the cable clip 6.

A cable clip 6 will be described with reference to FIG. 10 to FIG. 12. Note that the orientation of the cable clip 6 in FIG. 10 to FIG. 12 corresponds to the orientation of the print device 1 in a state in which the cable clip 6 is attached to the right surface 10D of the housing 10 (refer to FIG. 1). The cable clip 6 extends in the up-down direction, and has a half-cylindrical shape in which a part of a right surface is open so as to form the shape of an open ring. The cable clip 6 has an attachment portion 6A, a back portion 6C, a front holding portion 6D and a rear holding portion 6E.

The back portion 6C is a substantially rectangular plate-shaped portion. The attachment portion 6A branches into two parts and protrudes to the left from substantially the center of the back portion 6C in the up-down direction and the left-right direction. A leading end portion of the attachment portion 6A has a collar-shaped barb portion 6B. The cable clip 6 is attached to the housing 10 such that the attachment portion 6A, which is inserted into a hole (not shown in the drawings) formed in the right surface 10D of the housing 10, expands in the radial direction of the hole inside the housing 10 and the barb portion 6B is caught on the inner surface of the housing 10.

The front holding portion 6D extends to the right from a front end portion of the back portion 6C. A connection portion of the front holding portion 6D and the back portion 6C has a gentle arc shape in a plan view. A right end portion 6F of the front holding portion 6D is curved to the rear in a gentle arc shape in a plan view. The rear holding portion 6E extends to the right from a rear end portion of the back portion 6C in parallel with the front holding portion 6D. A connection portion of the rear holding portion 6E and the back portion 6C has a gentle arc shape in a plan view. A right end portion 6G of the rear holding portion 6E is curved to the front in a gently arc shape in a plan view. The right end portion 6F of the front holding portion 6D and the right end portion 6G of the rear holding portion 6E face each other in the front-rear direction. A gap that is larger than the diameter of the USB cable 79 is provided between the right end portion 6F and the right end portion 6G. The back portion 6C, the front holding portion 6D and the rear holding portion 6E have a half-cylindrical shape that is open in a substantial C-shape in a plan view.

As shown in FIG. 1, when the keyboard 7 is mounted on the mounting portion 11, the USB cable 79 is folded up and inserted into the ring formed by the cable clip 6. The cable clip 6 can clamp the USB cable 79 using inner surfaces of the back portion 6C, the front holding portion 6D and the rear holding portion 6E, and can hold the USB cable 79 in the ring. The user inserts the USB cable 79 in a folded state into the ring of the cable clip 6, by causing the USB cable 79 to pass through the gap between the right end portion 6F and the right end portion 6G, so that the USB cable 79 can be held. Further, by causing the USB cable 79 to pass through the gap between the right end portion 6F and the right end portion 6G, the user can pull out the USB cable 79 from the inside of the ring of the cable clip 6 while stretching the USB cable 79 that is in the folded state.

The keyboard 7 of the print device 1 can be detachably mounted on the mounting portion 11. The attachment and detachment of the keyboard 7 is performed in a state in which the grip portion 21 of the handle 2 is disposed in the second position P2. When the keyboard 7 is mounted such that the main surface 7A is directed upward (refer to FIG. 1), the pair of groove portions 77B and 77D (refer to FIG. 9) formed in the front surface and the rear surface of the keyboard 7 are respectively engaged with the pair of collar portions 4B and 3B (refer to FIG. 3) of the mounting portion 11. The keyboard 7 can be mounted on the mounting portion 11, and also can be detached from the mounting portion 11, along the left-right direction in which the groove portions 77B and 77D and the collar portions 4B and 3B extend. The rotation axis C of the cover 12 extends in the left-right direction, which is the direction in which the keyboard 7 is attached and detached. When the cover 12 is opened and closed, an external force is applied to the keyboard 7 mounted on the mounting portion 11 on the upper portion of the cover 12, in an extending direction of a tangent line B (refer to FIG. 2) that is tangential to the circumferential direction A of the rotation axis C. Since the tangent line B is orthogonal to the rotation axis C, the attachment/detachment direction of the keyboard 7 is orthogonal to the direction of the external force that is applied to the keyboard 7 when the cover 12 is opened and closed. Thus, the keyboard 7 does not become disengaged from the mounting portion 11 due to the force resulting from the opening and closing the cover 12. Further, there are cases in which the user grips and lifts the keyboard 7 when the user opens the cover 12 or the user pushes down the keyboard 7 from above when the user closes the cover 12. Even in these cases, the direction of the external force applied to the keyboard 7 is orthogonal to the attachment/detachment direction, and the keyboard 7 does not receive the external force in the attachment/detachment direction. Therefore, the keyboard 7 does not become disengaged from the mounting portion 11.

Further, when the cover 12 is closed in a state in which the keyboard 7 is mounted on the mounting portion 11, the direction of a gravity component added to the keyboard 7 is the up-down direction. When the cover 12 is opened in this state, the gravity component is also added to the keyboard 7 in the front-rear direction. However, since the left-right direction is orthogonal to the direction of gravity, the gravity component is not added in the attachment/detachment direction of the keyboard 7. Thus, the keyboard 7 does not become disengaged from the mounting portion 11 by the gravity applied to the keyboard 7.

In addition, although the groove portions 77B and 77D of the keyboard 7 are formed on the left end portion of the keyboard 7, they are not formed on the right end portion. Thus, the keyboard 7 can be mounted on the mounting portion 11 from the left end portion side on the opposite side to the right end portion where the connection portion 73 of the USB cable 79 is provided. The mounting portion 11 has the restriction portion 5 on the left end portion, and the right end portion is open. Therefore, the mounting portion 11 allows the attachment and detachment of the keyboard 7 only from the right surface 10D side of the housing 10, on which is provided the plug housing portion 10F in which the USB connector 19 is exposed. Thus, when the keyboard 7 is attached and detached, the USB cable 79 is positioned to the right of the mounting portion 11 and to the right of the keyboard 7, and does not intersect with the mounting portion 11. It is thus possible to suppress a load from being applied to the USB cable 79.

The collar portions 3B and 4B of the mounting portion 11 are provided at the center in the left-right direction of the holding portions 3 and 4. When the keyboard 7 is mounted on the mounting portion 11, the load applied to the collar portions 3B and 4B by the weight of the keyboard 7 is unlikely to be applied to the collar portions 3B and 4B such that the load is biased to one side in the attachment/detachment direction. Further, non-engagement sections of the collar portions 3B and 4B and the groove portions 77B and 77D can be disposed as a pair on both sides of engagement sections in the attachment/detachment direction. Thus, the mounting portion 11 can hold the keyboard 7 in a well-balanced manner. Further, the length of the collar portions 3B and 4B in the left-right direction is equal to or more than one third of the length of the cover 12 and less than the length of the cover 12. The closer the length of the collar portions 3B and 4B in the left-right direction is to the length of the cover 12, the more an engagement range of the collar portions 3B and 4B and the groove portions 77B and 77D can be increased. Thus, the mounting portion 11 can hold the keyboard 7 more reliably. The closer the length of the collar portions 3B and 4B in the left-right direction is to one third of the length of the cover 12, the more the engagement range of the collar portions 3B and 4B and the groove portions 77B and 77D decreases. However, by reducing a length over which the keyboard 7 slides, the keyboard 7 can be mounted on and removed from the mounting portion 11. Further, when the length of the collar portions 3B and 4B in the left-right direction is equal to or more than one third of the length of the cover 12, the length of each of the non-engagement sections that are provided as a pair on the both sides in the attachment/detachment direction of the engagement sections of the collar portions 3B and 4B and the groove portions 77B and 77D can be shorter than the length of the engagement sections. Therefore, the load at the non-engagement sections due to the weight of the keyboard 7 can be sufficiently supported by the engagement sections.

When the user carries the print device 1, the grip portion 21 of the handle 2 is moved to the first position P1 (refer to FIG. 1). The support portions 25 and 26 of the handle 2 are disposed in the left-right direction of the mounting portion 11. The support portion 25 is positioned on the side of the right end portion of the mounting portion 11, the right end portion having no restriction portion 5 and being open. In other words, when the keyboard 7 is mounted on the mounting portion 11, the support portion 25 is positioned to the right of the keyboard 7. For example, when the keyboard 7 receives an external force in the attachment/detachment direction due to swinging or the like during conveyance and the engagement between the cut-out portions 3C and 4C of the collar portions 3B and 4B and the protruding portions 78 of the groove portions 77B and 77D fails, the right surface of the keyboard 7 comes into contact with the support portion 25. Thus, the movement of the keyboard 7 in the attachment/detachment direction is restricted by the support portion 25, and the keyboard 7 does not become disengaged from the mounting portion 11.

The keyboard 7 has the connection portion 73 of the USB cable 79 at substantially the center in the front-rear direction of the right end portion. The other end portion 25B of the support portion 25 of the handle 2 is attached to the right surface 10D of the housing 10, at substantially the central position in the front-rear direction. Therefore, when the grip portion 21 of the handle 2 is positioned in the first position P1, the virtual line L3 (refer to FIG. 5) that connects the one end portion 25A and the other end portion 25B of the support portion 25 intersects the connection portion 73. Since the support portion 25 of the handle 2 has the bent portion 25C, the support portion 25 is disposed while avoiding a position that overlaps with the connection portion 73. It is thus possible to avoid contact with the USB cable 79.

The grip portion 21 of the handle 2 is restricted from moving to the rear of the first position P1 by the rotation inhibiting mechanism 45. Thus, the support portions 25 and 26 do not block the tube insertion opening 15 and the tube discharge opening 16, and do not come into contact with the tube 9.

When the keyboard 7 is removed from the mounting portion 11, the user can place the keyboard 7 on the flat surface to perform an operation on the operation portion 70, and can edit characters, symbols, graphics and the like to be printed on the print medium. Since the cable clip 6 has an open ring shape, the user can easily pull out and stretch the USB cable 79 held by the cable clip 6, and can move the keyboard 7. The four legs 74 provided in the four corners of the back surface 7B of the keyboard 7 maintain the protruding portions 75 and 76 in a state of being separated from the flat surface. Since the keyboard 7 is stably supported on the flat surface by the four legs 74 provided in the four corners of the back surface 7B, the keyboard 7 does not wobble when the user performs an operation on the operation portion 70

When the user places the keyboard 7 removed from the mounting portion 11 on the flat surface, the user can also cause the keyboard 7 to lean against the handle 2 (refer to FIG. 3). At this time, the handle 2 is disposed such that the grip portion 21 is positioned in the second position P2 (refer to FIG. 1). The user disposes the rear side of the keyboard 7 on top of the grip portion 21. Since the length of the keyboard 7 in the left-right direction is shorter than the length of the grip portion 21 in the left-right direction, the user can dispose the keyboard 7 between the support portions 25 and 26 without interference with the support portions 25 and 26. The user can use the support portions 25 and 26 to adjust the position of the keyboard 7 in the left-right direction.

The user causes the keyboard 7 disposed on the grip portion 21 to move in the front-rear direction. The protruding portion 75 on the rear side of the back surface 7B of the keyboard 7 is fitted into the concave portion 22 formed in the upper surface when the grip portion 21 is positioned in the second position P2, and the keyboard 7 and the grip portion 21 are positioned with respect to each other. Since the positioning of the keyboard 7 and the grip portion 21 is performed by the engagement of the protruding portion 75 and the concave portion 22, the user can easily determine the position of the keyboard 7 with respect to the grip portion 21 without peering at the position of the protruding portion 75 with respect to the concave portion 22. Note that, since the grip portion 21 side is formed to be concave, when the user carries the print device 1, nothing bumps into a hand of the user that is gripping the grip portion 21, and the user can easily carry the print device 1. Further, since the protruding portion 75 and the concave portion 22 can be formed integrally with the keyboard 7 and the handle 2, respectively, they can be easily provided without attaching other components.

The protruding portion 75 and the concave portion 22 extend long in the left-right direction. Thus, when the protruding portion 75 and the concave portion 22 are engaged with each other, they can secure a wider contact area and can easily maintain the engagement state. Thus, when the user performs an operation on the operation portion 70 of the keyboard 7, it is possible to suppress positional displacement of the keyboard 7 caused by vibration and the like. Further, since the protruding portion 75 and the concave portion 22 are engaged with each other with a long contact length in the left-right direction, it is also possible to suppress positional displacement of the keyboard 7 with respect to the grip portion 21 in the direction of rotation around the engagement position of the protruding portion 75 and the concave portion 22.

The grip portion 21 is provided with the pair of concave portions 23. When the protruding portion 75 is engaged with the concave portion 22, the two legs 74 on the rear side of the back surface 7B of the keyboard 7 are respectively engaged with the pair of concave portions 23. Due to the engagement of the legs 74 and the concave portions 23, the keyboard 7 can be positioned with respect to the grip portion 21 more reliably.

The user lowers the front side of the keyboard 7 positioned with respect to the grip portion 21, onto the flat surface. The rear side of the keyboard 7 is brought into a state of being leaned against the grip portion 21, and is positioned higher than the front side by a height corresponding to the size of the grip portion 21. Therefore, the keyboard 7 is disposed on the flat surface with the main surface 7A being inclined with respect to the flat surface such that the front side of the main surface 7A is positioned lower than the rear side (refer to FIG. 3). Since the keyboard 7 can be inclined and disposed in this manner, the user can easily see the tops of the keys and the display portion 71 and can easily perform an operation on the operation portion 70.

The protruding portion 76 provided on the front side of the back surface 7B of the keyboard 7 is positioned further to the front than the two legs 74 provided on the front side of the back surface 7B. Therefore, when the rear side of the keyboard 7 leaned against the grip portion 21, the protruding portion 76 can be in contact with the flat surface in a state in which the legs 74 are separated from the flat surface. The protruding portion 76 is formed to be long in the left-right direction and has an anti-slip effect. It is therefore possible to suppress the keyboard 7 from slipping with respect to the flat surface.

Thus, the user can easily perform an operation on the operation portion 70.

Since the support portions 25 and 26 of the handle 2 have the bent portions 25C and 26C, the angle of inclination of the support portions 25 and 26 with respect to the flat surface is gentler than that when the bent portions 25C and 26C are not provided. The length in the left-right direction of the keyboard 7 of the present embodiment is shorter than the grip portion 21. Therefore, the structure of the bent portions 25C and 26C is unlikely to affect the inclination angle when the keyboard 7 is leaned against the grip portion 21. However, in the formation of the grip portion 21, in order to form the concave portion 22 that is engaged with the protruding portion 75 of the keyboard 7, it is necessary to provide, on the grip portion 21, a contact portion having a size required to form the concave portion 22 in accordance with the angle of the keyboard 7 when the keyboard 7 is leaned against the grip portion 21. The angle of inclination of the support portions 25 and 26 with respect to the flat surface is gentle due to the structure of the bent portions 25C and 26C. Therefore, it is easy to secure the contact area of the grip portion 21 and the back surface 7B of the keyboard 7 without significantly machining and processing the grip portion 21. Thus, it is easy to form the concave portion 22 that engages with the protruding portion 75.

If the length of the keyboard in the left-right direction is longer than the grip portion 21, when the keyboard is leaned against the grip portion 21, both end portions of the keyboard in the left-right direction respectively come into contact with the one end portions 25A and 26A of the support portions 25 and 26. At this time, there is a possibility that the angle of inclination of the keyboard with respect to the flat surface may be larger than that in the present embodiment, depending on the positions of contact with the support portions 25 and 26. In this type of case, if the support portions 25 and 26 are configured to have the bent portions 25C and 26C, even when the keyboard comes into contact with the support portions 25 and 26, it is possible to further reduce the angle of inclination of the keyboard with respect to the flat surface.

Note that the present disclosure is not limited to the above-described embodiment and various changes can be made. Although the holding portions 3 and 4 of the mounting portion 11 are respectively provided at the rear end portion and the front end portion of the upper surface of the cover 12, they may be respectively provided at the left end portion and the right end portion. The restriction portion 5 may be provided at the rear end portion of the upper surface of the cover 12. In this case, in the process of opening and closing the cover 12, the attachment/detachment direction of the keyboard 7 changes between the front-rear direction when the cover 12 is closed and the up-down direction when the cover 12 is opened. However, regardless of whether the cover 12 is opened or closed, the attachment/detachment direction of the keyboard 7 is orthogonal to the extending direction of the tangent line B that is tangential to the circumferential direction A of the rotation axis C at the front end portion of the cover 12. Therefore, even when the user erroneously grasps the keyboard 7 when the cover 12 is opened or closed, the keyboard 7 does not become disengaged from the mounting portion 11.

For example, the legs 74 may be omitted from the keyboard 7, and the keyboard 7 may be configured such that the protruding portions 75 and 76 are provided over the entire length of the keyboard 7 in the left-right direction and the protruding portions 75 and 76 also serve as the legs 74. Alternatively, for example, the protruding portions 75 and 76 may be omitted from the keyboard 7, and the keyboard 7 may be configured such that the legs 74 also serve as the protruding portions 75 and 76 and are used to perform positioning with respect to the grip portion 21.

The restriction portion 5 of the mounting portion 11 need not necessarily be provided. Instead of the collar portions 3B and 4B, groove portions may be formed in the holding portions 3 and 4 of the mounting portion 11, and instead of the groove portions 77A to 77D, collar portions may be provided on the front surface and the rear surface of the keyboard 7. The keyboard 7 and the control board 18 need not necessarily be connected via the USB cable 79, and may be connected by wireless communication, such as Bluetooth (registered trademark).

In the above-described embodiment, the concave portion 22 is provided in the grip portion 21 of the handle 2, and engages with the protruding portion 75 provided on the keyboard 7, thus performing positioning of the keyboard 7. However, for example, a rubber plate may be attached to the back surface 7B of the keyboard 7, and a frictional force may be used to perform positioning with respect to the grip portion 21. Alternatively, a rubber plate may be attached to the grip portion 21, and a frictional force may be used to perform positioning with respect to the back surface 7B of the keyboard 7. Further, a hook or the like may be provided on the keyboard 7, and the positioning of the keyboard 7 with respect to the grip portion 21 may be performed by latching the hook onto the grip portion 21.

What is claimed is:

1. A print device comprising:
a housing having an opening formed in an upper portion thereof and internally housing a print portion and a control portion, the print portion printing on a print medium, and the control portion controlling driving of the print portion;
a lid body disposed on the upper portion of the housing, the lid body opening and closing the opening of the housing by a side of a second end portion of the lid body pivoting around a predetermined rotation axis provided at a first end portion of the lid body;
a display device displaying information related to printing controlled by the control portion; and
a mounting portion provided on an upper portion of the lid body when the opening of the housing is closed, the display device being attachable to and detachable from the mounting portion along a predetermined attachment/detachment direction with respect to the lid body, and the predetermined attachment/detachment direction being orthogonal to an extending direction of a tangent line, the tangent line being tangential to a circumferential direction of the predetermined rotation axis at a position of the second end portion of the lid body.

2. A print device comprising:
a housing portion internally housing a print portion, the print portion printing on a print medium; and
a rotating member being configured to pivot around a predetermined rotation axis with respect to the housing portion, and being attachable to and detachable from the housing portion along an axial direction of the predetermined rotation axis,
wherein the rotating member is provided on an upper portion of the housing portion, the rotating member is configured to pivot a second end portion side of the rotating member around a second predetermined rotation axis provided at a first end portion of the rotating member, and the rotating member is capable of being attached to and detached from the housing portion along the second predetermined rotation axis by a member extending in the axial direction of the second predetermined rotation axis.

3. The print device according to claim 2, wherein the housing portion internally houses the print portion and a control portion controlling driving of the print portion.

4. The print device according to claim 2, wherein
one of the housing portion and the rotating member is provided with a groove portion, and
another of the housing portion and the rotating member is provided with a collar portion, the collar portion being configured to engage with the groove portion as the rotating member is being attached to and detached from the housing portion.

5. The print device according to claim 4, wherein
the collar portion is formed on the housing portion, and the groove portion is formed on the rotating member.

* * * * *